United States Patent [19]

Kido

[11] Patent Number: 4,559,913
[45] Date of Patent: Dec. 24, 1985

[54] RELIABILITY ENSURING SYSTEM FOR INTERNAL COMBUSTION ENGINE

[75] Inventor: Yoshinobu Kido, Hiroshima, Japan
[73] Assignee: Mazda Motor Corporation, Hiroshima, Japan
[21] Appl. No.: 609,980
[22] Filed: May 14, 1984
[30] Foreign Application Priority Data May 17, 1983 [JP] Japan ................... 58-86879

[51] Int. Cl.⁴ ........................... F02B 77/08
[52] U.S. Cl. ..................... 123/352; 123/432
[58] Field of Search ............ 123/319, 340, 349, 352, 123/357, 419, 432; 60/601, 603

[56] References Cited

U.S. PATENT DOCUMENTS

| | | | |
|---|---|---|---|
| 3,878,915 | 4/1975 | Purland et al. | 123/350 |
| 4,265,202 | 5/1981 | Matsumoto | 123/432 |
| 4,355,607 | 10/1982 | Blaney | 123/350 |
| 4,365,599 | 12/1982 | Ikeura | 123/340 |
| 4,457,276 | 7/1984 | Ueda et al. | 123/340 |
| 4,470,391 | 9/1984 | Ishida | 123/432 |

FOREIGN PATENT DOCUMENTS 51-129529 11/1976 Japan .
0135732 10/1981 Japan ................. 123/350

Primary Examiner—Parshotam S. Lall
Attorney, Agent, or Firm—Murray, Whisehunt and Ferguson

[57] ABSTRACT

A reliability ensuring system for an internal combustion engine comprises an operating state detecting means for detecting the value of an engine parameter to be controlled which could affect the reliability of the engine and should be controlled when it goes outside a normal region. A preset value generating means generates a plurality of preset values with respect to the value of the engine parameter to be controlled, the preset values corresponding to different degrees of deviation of the engine parameter to be controlled from the normal region. An output signal generating means generates an output when the detected value of the engine parameter to be controlled exceeds one of the preset values for a predetermined time interval. The predetermined time interval is determined for each preset value so that it increases as the degree of deviation of the factor to be controlled from the normal region is reduced. A control means controls an engine parameter affecting the engine parameter to be controlled to move the value of the same toward the normal region when the output signal is generated.

11 Claims, 4 Drawing Figures

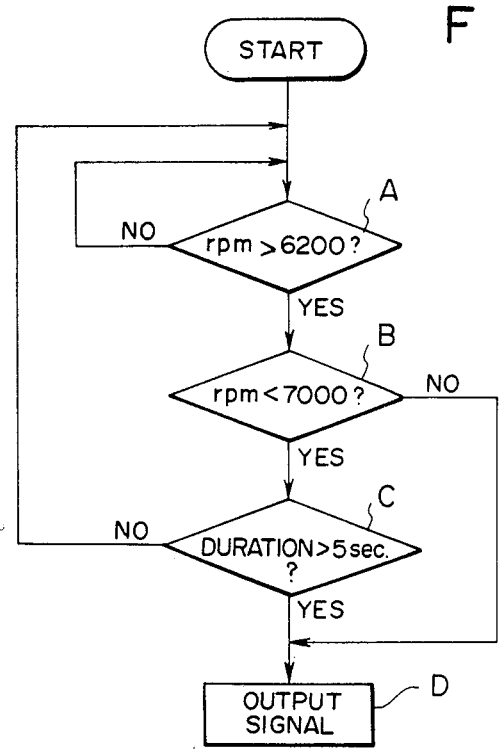
FIG.2
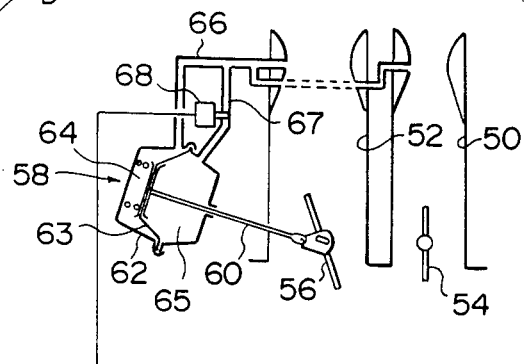
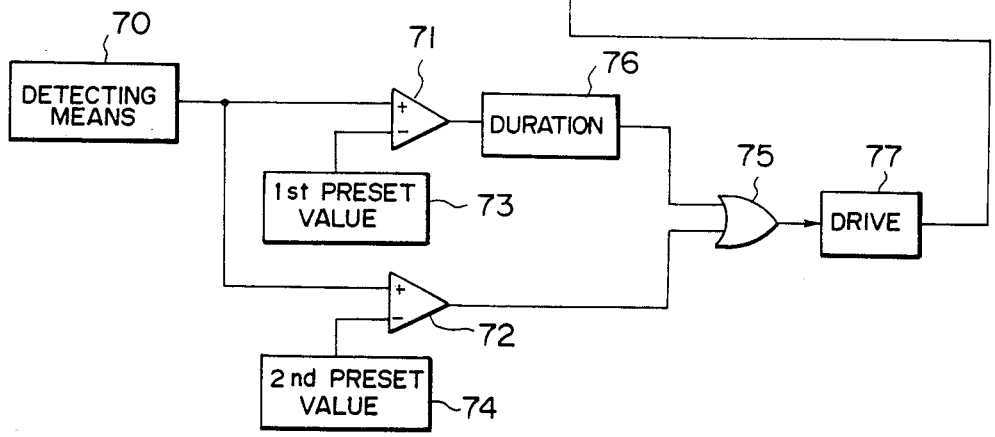
FIG.3

RELIABILITY ENSURING SYSTEM FOR INTERNAL COMBUSTION ENGINE

BACKGROUND OF THE INVENTION

1. Field of the Invention

This invention relates to a reliability ensuring system for an internal combustion engine, and more particularly to a reliability ensuring system for an internal combustion engine which maintains the reliability of the engine by controlling the operating state of the engine when the value of an engine parameter representing the operating state of the engine goes into such a range as to adversely affect the reliability of the engine.

2. Description of the Prior Art

In internal combustion engines, particularly in supercharged engines, proper measures must be taken in order to ensure engine reliability when the value of an engine parameter representing the operating state of the engine, e.g., engine speed (rpm), negative pressure in the intake passage, amount of intake air, coolant temperature and maximum combustion pressure, goes into such a range as to adversely affect the reliability of the engine.

In Japanese Unexamined Patent Publication No. 51(1976)-129529, there is disclosed a reliability ensuring system for an internal combustion engine in which fuel feed to the engine is immediately interrupted to lower the engine rpm when the engine rpm exceeds a preset limit value. However, this system is disadvantageous from the following viewpoint. If the preset limit value is determined on the basis of normal operating state of the vehicle, the engine speed could be lowered when the engine speed temporarily exceeds the preset limit value, for instance, during acceleration for passing and there would arise a danger of being collided into from behind, while if the preset limit value is set at a value higher than that determined on the basis of the normal operating state, the reliability of the engine is adversely affected when the engine rpm is long kept at a value slightly lower than the preset limit value. Generally, deviation of the operating state from the normal operating state should be permitted or is needed for proper driving of the vehicle and does not adversely affect the reliability of the engine so long as the degree of the deviation is relatively small and the duration thereof is relatively short, while the deviation could adversely affect the reliability of the engine if it continues for a long time even if its degree is relatively small. Further, a deviation of large degree could adversely affect the reliability of the engine even if its duration is short.

SUMMARY OF THE INVENTION

In view of the foregoing observations and description, the primary object of the present invention is to provide a reliability ensuring system for an internal combustion engine in which the operating state of the engine is controlled to ensure the reliability of the engine only when occasion demands taking into account both the duration and degree of the deviation of the operating state from the normal operating state.

Another object of the present invention is to provide a reliability ensuring system for an internal combustion engine which can effectively ensure the reliability of the engine without adversely affecting the drivability of the vehicle equipped with the engine.

The reliability ensuring system for an internal combustion engine of the present invention comprises an operating state detecting means for detecting the value of an engine parameter which could affect the reliability of the engine and should be controlled when it goes outside a certain region within which it is considered to be of a normal value (Such engine parameters will be referred to as "factors to be controlled" and the region will be referred to as the "normal region", hereinbelow.); a preset value generating means which generates a plurality of preset values with respect to the value of the "factor to be controlled" to be detected by the operating state detecting means, the preset values corresponding to different degrees of deviation of the factor to be controlled from said normal region; a comparing means for comparing the detected value of the factor to be controlled with said respective preset values; an output signal generating means which generates an output signal when the detected value of the factor to be controlled exceeds one of the preset values for a predetermined time interval, the predetermined time interval being determined for each preset value so that it increases as the degree of deviation of the factor to be controlled from the normal region is reduced, and a control means which controls at least one engine parameter affecting the factor to be controlled (Such engine parameters will be referred to as "controlling factors", hereinbelow.) to move the value of the factor to be controlled toward the normal region upon receipt of the output signal from the output signal generating means.

For example, when the engine rpm is higher than a first preset value and lower than a second preset value which is higher than the first preset value, and when this state continues for a first predetermined time interval, the output signal generating means generates an output signal and the control means cuts off fuel to be fed to the engine or reduces the amount of fuel to be fed to the same, thereby reducing the engine rpm to the normal region. When the engine rpm is higher than the second preset value for a second predetermined time interval which is shorter than the first predetermined time interval, the output signal is generated to lower the engine rpm. That is, even if the engine speed exceeds the normal upper limit by a relatively large degree, the reliability of the engine will not be adversely affected so long as the time interval for which the engine speed exceeds the same is relatively short, and at the same time, if the engine speed is positively lowered when the engine speed temporarily exceeds the normal upper limit, the drivability of the vehicle could be adversely affected as described above. On the other hand, even when the degree of deviation of the engine speed from the normal upper limit is relatively small, the reliability of the engine can be adversely affected if the duration is long. Therefore, the first predetermined time interval is made longer than the second predetermined time interval.

The engine speed (rpm) can also be controlled by controlling the amount of intake air and by controlling the ignition timing. That is, when the engine rpm is the factor to be controlled, means for controlling the amount of fuel to be fed to the engine, the amount of intake air and the ignition timing can be the controlling factors. Also, when the factor to be controlled is the amount of intake air or the coolant temperature, means for controlling the amount of fuel to be fed to the engine, the amount of intake air and the ignition timing can be the controlling factors.

BRIEF DESCRIPTION OF THE DRAWINGS

FIG. 2 is a view showing the operation of the system in the form of a flowchart, FIG. 3 is a schematic view showing a reliability ensuring system in accordance with another embodiment of the present invention.

DESCRIPTION OF THE PREFERRED EMBODIMENTS

Figure 1:
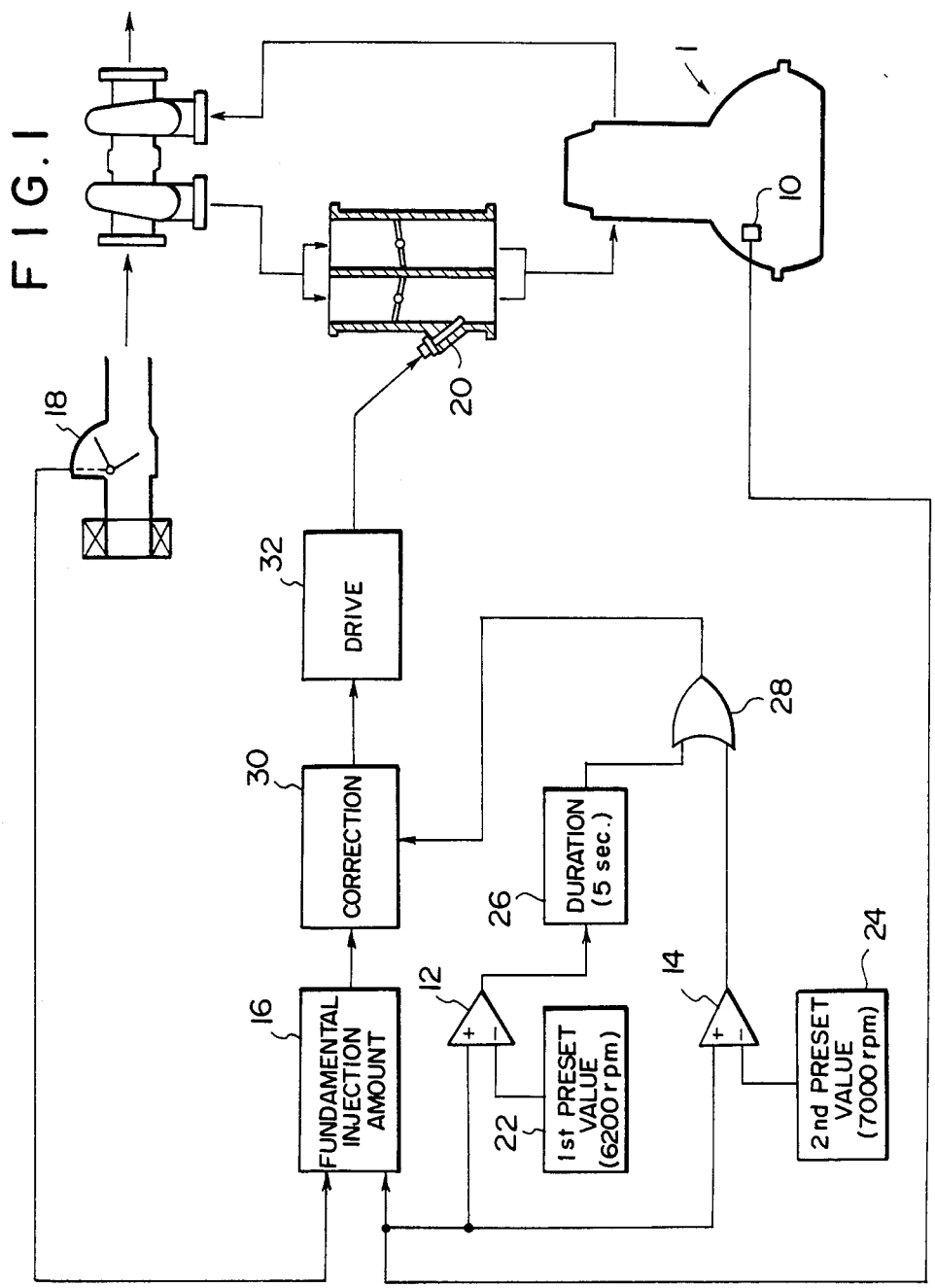
FIG. 1 is a schematic view showing a reliability ensuring system for an internal combustion engine in accordance with an embodiment of the present invention.

FIG. 1 is a schematic view showing a reliability ensuring system for an internal combustion engine in accordance with an embodiment of the present invention in which the "factor to be controlled" is the engine rpm and the "controlling factor" is the means for controlling the amount of fuel to be fed to the engine.

In FIG. 1, the reliability ensuring system of this embodiment includes an engine rpm sensor 10 (as the operating state detecting means) which detects the engine rpm of an engine 1. The output of the engine rpm sensor 10 is inputted into a first comparator 12, a second comparator 14 and a fundamental fuel-injection amount determining circuit 16. The output of an air flowmeter 18 for detecting the amount of intake air introduced into the engine 1 is also inputted into the fundamental fuel-injection amount determining circuit 16. The fundamental fuel-injection amount determining circuit 16 generates a fuel injection pulse having a fundamental width for driving a fuel injection valve 20 according to the amount of intake air and the engine rpm respectively represented by the outputs of the air flowmeter 18 and the engine rpm sensor 10. Into the first comparator 12 is further inputted the output of a first preset value generating circuit 22, and into the second comparator 14 is further inputted the output of a second preset value generating circuit 24. The first preset value generating circuit 22 outputs a first preset value which corresponds to 6200 rpm in this particular embodiment and the second preset value generating circuit outputs a second preset value which is larger than the first preset value and corresponds to 7000 rpm in this particular embodiment. The first comparator 12 compares the detected or actual engine rpm inputted from the engine rpm sensor 10 with the first preset value (6200 rpm) and generates an output when the actual engine rpm exceeds the first preset value. The output of the first comparator 12 is inputted into a time measuring circuit 26 which generates an output when the duration of the output of the first comparator 12 exceeds a predetermined time interval which is five seconds in this particular embodiment. The output of the time measuring circuit 26 is inputted into an OR circuit 28. The second comparator 14 compares the actual engine rpm with the second preset value (7000 rpm) and generates an output when the actual engine rpm exceeds the second preset value. The output of the second comparator 14 is directly inputted into the OR circuit 28. The OR circuit 28 generates an output when at least one of the outputs of the time measuring circuit 26 and the second comparator 14 is inputted thereinto. That is, when the actual engine rpm exceeds the first preset value for the predetermined time interval and/or as soon as the actual engine rpm exceeds the second preset value, the OR circuit 28 generates an output. The output of the OR circuit 28 is inputted into a correction circuit 30. The correction circuit 30 corrects the fundamental width of the fuel injection pulse which is generated by the fundamental fuel-injection amount determining circuit 16 to be fed to a fuel injection valve driving circuit 32, to reduce the amount of fuel to be injected from the fuel injection valve 20, thereby lowering engine rpm. When no output is generated from the OR circuit 28, the width of the fuel injection pulse is not corrected.

Even if the engine rpm is increased up to between 6200 rpm and 7000 rpm, the reliability of the engine 1 is not significantly affected so long as the duration is shorter than five seconds, for example, and on the contrary, the engine rpm should be permitted to increase temporarily up to the range during acceleration for passing. On the other hand, when the engine rpm is increased over 7000 rpm, the reliability of the engine 1 is significantly affected. Therefore, in the reliability ensuring system of this embodiment, even if the engine speed is increased to between 6200 rpm and 7000 rpm, measures for lowering the engine rpm are not taken until the state has continued for five seconds, while the measures for lowering the engine rpm are taken as soon as it exceeds 7000 rpm.

FIG. 2 shows the operation of the reliability ensuring system of this embodiment in the form of a flowchart. In FIG. 2, it is determined whether or not the actual engine rpm is higher than 6200 rpm in step A. If NO, the step A is repeated. If YES, it is determined whether or not the actual engine rpm is lower than 7000 rpm in step B. If NO, i.e., the engine rpm is higher than 7000 rpm, an output signal for correcting the width of the fuel injection pulse is immediately generated. If YES, i.e., the actual engine rpm is higher than 6200 rpm but lower than 7000 rpm, it is determined whether or not the state continues for more than five seconds in step C. If NO, the step A is repeated. If YES, the output signal for correcting the width of the fuel injection pulse is generated (step D).

It is preferred that the amount of fuel be gradually reduced when the output signal is generated, in order to prevent torque shock.

FIG. 3 is a schematic view showing a reliability ensuring system in accordance with another embodiment of the present invention in which the "controlling factor" is the means for controlling the amount of intake air.

In FIG. 3, the intake passage of an engine (not shown) is divided into a primary intake passage 50 and a secondary intake passage 52 which are respectively provided with a primary valve 54 and a secondary valve 56 for controlling the amount of air flowing therethrough. The primary valve 54 is operatively connected with an accelerator pedal (not shown) to be opened and closed thereby, and the secondary valve 56 is controlled by an actuator 58 which is connected to the secondary valve 56 by way of a connecting rod 60. The actuator 58 comprises a housing 62 and a spring urged diaphragm 63 mounted in the housing 62 to divide the interior thereof into a negative pressure chamber 64 and an atmospheric pressure chamber 65. The connecting rod 60 is connected to the secondary valve 56 at one end and to the diaphragm 63 at the other end so that the secondary valve 56 is opened and closed in response to the movement of the diaphragm 63. The negative pressure chamber 64 is communicated with both the primary and secondary intake passages 50 and 52 by way of a negative pressure passage 66 so that venturi negative pressure from the intake passages 50 and 52 is applied thereto. The atmospheric pressure chamber 65 is open to the atmosphere and is communicated with the negative pressure passage 66 by way of an atmospheric pressure passage 67. The atmospheric pressure passage 67 is provided with a solenoid valve 68 which normally closes the atmospheric pressure passage 67. When load on the engine exceeds a predetermined value, i.e., when the negative pressure applied to the negative pressure chamber 64 overcomes the force of the spring urging the diaphragm 63, the diaphragm 63 is moved leftward in FIG. 3 to open the secondary valve 56 due to the difference in pressure between the negative pressure chamber 64 and the atmospheric pressure chamber 65. When the solenoid valve 68 in the atmospheric pressure passage 67 is opened, the difference in pressure between the chambers 64 and 65 is nullified, whereby the secondary valve 56 is closed to reduce the amount of intake air introduced into the engine.

A detecting signal from a detecting means 70 which may be a sensor for detecting a factor to be controlled such as the engine rpm, the coolant temperature or the amount of intake air is inputted into a first comparator 71 and a second comparator 72. Into the first comparator 71 is inputted a first preset value from a first preset value generating circuit 73, and into the second comparator 72 is inputted a second preset value from a second preset value generating circuit 74, the second preset value being larger than the first preset value. The first comparator 71 is connected with an OR circuit 75 by way of a time measuring circuit 76 which generates an output when the duration of the output of the first comparator 71 is longer than a predetermined time interval, and the second comparator 72 is directly connected with the OR circuit 75. The output of the OR circuit 75 is connected to a solenoid valve driving circuit 77 which opens the solenoid valve 68 to close the secondary valve 56 in the manner described above. That is, the secondary valve 56 is closed, when the value of the factor to be controlled is between the first and second preset value and this state continues for the predetermined time interval, or as soon as the value of the factor to be controlled exceeds the second preset value.

Figure 4:
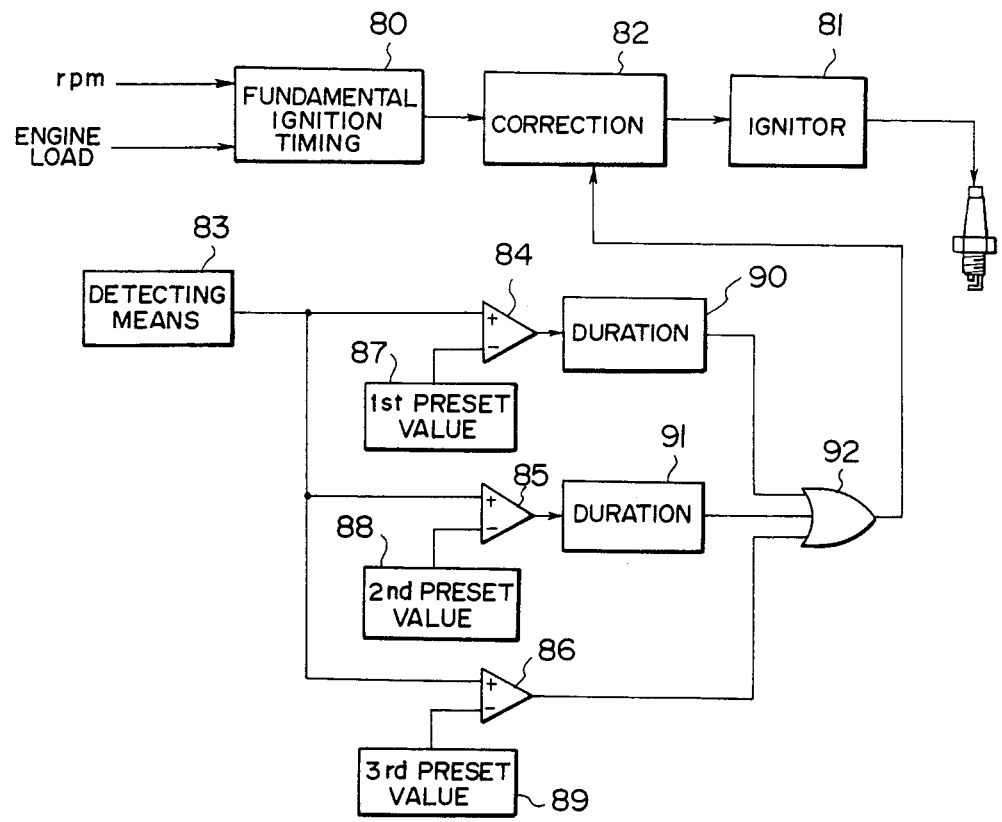
FIG. 4 is a schematic view showing a reliability ensuring system in accordance with still another embodiment of the present invention.

FIG. 4 is a schematic view showing a reliability ensuring system in accordance with still another embodiment of the present invention in which the "controlling factor" is a means for controlling the ignition timing and the preset value generating means generates three preset values. In FIG. 4, a fundamental ignition timing determining circuit 80 determines fundamental ignition timing from an engine rpm signal and an engine load signal and outputs a control signal which is fed to an ignitor 81 by way of a correction circuit 82 to control the ignitor 81.

A detecting signal from a detecting means 83 which may be a sensor for detecting a factor to be controlled such as the engine rpm, the coolant temperature or the amount of intake air is inputted into first to third comparators 84, 85 and 86. First to third preset value generating circuits 87, 88 and 89 respectively generate first to third preset values which are respectively inputted into the first and third comparators 84, 85 and 86, the first preset value being the smallest and the third preset value being the largest. The outputs of the first and second comparators 84 and 85 are connected with an OR circuit 92 by way of first and second time measuring circuits 90 and 91, respectively, and the output of the third comparator 86 is directly connected to the OR circuit 92. The first time measuring circuit 90 generates an output when the duration of the output of the first comparator 84 is longer than a first predetermined time interval, and the second time measuring circuit 91 generates an output when the second comparator 85 continues to output for a time longer than a second predetermined time interval which is shorter than the first predetermined time interval. That is, the OR circuit 92 generates an output which is fed to a correction circuit 82 to correct the fundamental ignition timing when the value of the factor to be controlled is larger than the first preset value which is the smallest and smaller than the second preset value which is of intermediate magnitude, and at the same time this state continues for the first predetermined time interval which is longer than the second predetermined time interval, or when the value of the factor to be controlled is larger than the second preset value and smaller than the third preset value, and this state continues for the second predetermined time interval, or as soon as the value of the same exceeds the third preset value.

I claim:

1. A reliability ensuring system for an internal combustion engine comprising an operating state detecting means for detecting the value of an engine parameter to be controlled which is relevant to the output of the engine and which is controlled when it goes outside a normal region of predetermined values, a preset value generating means for generating a plurality of preset values for the value of the engine parameter to be controlled, said preset values corresponding to different degrees of upward deviation of said engine parameter to be controlled from said normal region, a comparing means for comparing the detected value of said engine parameter to be controlled with said preset values; an output signal generating means which generates an output signal when the detected value of said engine parameter to be controlled exceeds one of said preset values for a predetermined time interval, said predetermined time interval being determined for each preset value so that it increases as the degree of deviation of said engine parameter to be controlled from said normal region is reduced; and a control means for controlling at least one controlling engine parameter which affects the engine parameter to be controlled, said control means controlling said controlling engine parameter so as to move the value of said engine parameter to be controlled toward said normal region upon receipt of said output signal from said output signal generating means so that the output of the engine is controlled to move toward its lower region.

2. A reliability ensuring system as defined in claim 1 in which said engine parameter to be controlled is the engine rpm.

3. A reliability ensuring system as defined in claim 2 in which said controlling engine parameter is a means for controlling the amount of fuel to be fed to the engine.

4. A reliability ensuring system as defined in claim 2 in which said controlling engine parameter is a means for controlling the amount of intake air.

5. A reliability ensuring system as defined in claim 4 in which said engine has primary and secondary intake passages respectively provided with primary and secondary valves, the secondary valve being adapted to be opened when the load on the engine exceeds a predetermined value, and said means for controlling the amount of intake air controls the secondary valve.

6. A reliability ensuring system as defined in claim 2 in which said controlling means is a means for controlling the ignition timing of the engine.

7. A reliability ensuring system as defined in claim 1 in which said engine parameter to be controlled is the amount of intake air.

8. A reliability ensuring system as defined in claim 7 in which said controlling engine parameter is a means for controlling the amount of fuel to be fed to the engine.

9. A reliability ensuring system as defined in claim 7 in which said controlling engine parameter is a means for controlling the amount of intake air.

10. A reliability ensuring system as defined in claim 9 in which said engine has primary and secondary intake passages respectively provided with primary and secondary valves, the secondary valve being adapted to be opened when the load on the engine exceeds a predetermined value, and said means for controlling the amount of intake air controls the secondary valve.

11. A reliability ensuring system as defined in claim 7 in which said controlling means is a means for controlling the ignition timing of the engine.

* * * * *